UNITED STATES PATENT OFFICE.

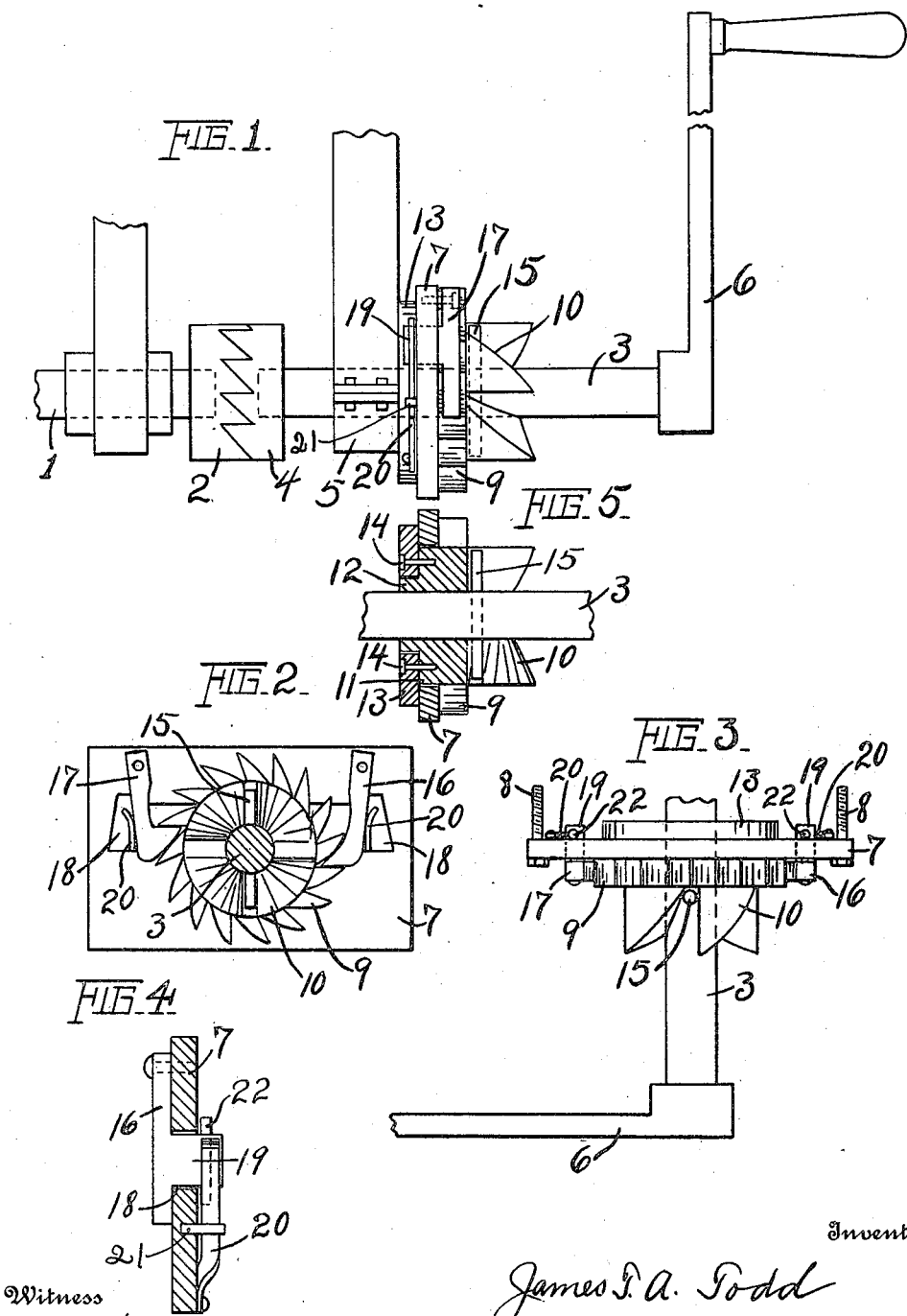

JAMES T. A. TODD, OF FORT WORTH, TEXAS.

SAFETY STARTING DEVICE FOR INTERNAL-COMBUSTION MOTORS.

1,261,977. Specification of Letters Patent. Patented Apr. 9, 1918.

Application filed March 12, 1917. Serial No. 154,076.

*To all whom it may concern:*

Be it known that I, JAMES T. A. TODD, a citizen of the United States of America, residing at Fort Worth, in the county of Tarrant and State of Texas, have invented certain new and useful Improvements in Safety Starting Devices for Internal-Combustion Motors, of which the following is a specification.

My invention relates to safety devices for motor vehicles and particularly to anti-kicking devices for crank-operated starters and electric starters; and the object is to provide simple and inexpensive devices which will prevent breaking of arms or wrists by the crank and also prevent breaking and up-setting the operating parts of electric starters. The advantage of the improvement is that the engine clutch will be instantly released in case of "kicking" and thus prevent injury to the operator or to the working parts of the motor. Other objects and advantages will be fully explained in the following description and the invention will be more particularly pointed out in the claims.

Reference is had to the accompanying drawings which form a part of this application.

Figure 1 is a side elevation of the improved safety devices. Fig. 2 is a face view of the same, showing the cranking shaft in section. Fig. 3 is a plan view of the same. Fig. 4 is a detail view of the locking dog and the spring for controlling the same. Fig. 5 is a vertical section of the ratchet and clutch and their connections.

Similar characters of reference are used to indicate the same parts throughout the several views.

In the drawings the engine or motor shaft 1 is provided with the usual clutch jaw 2 and a crank shaft 3 is provided with the usual clutch jaw 4 which engages the clutch jaw 2 to operate the motor shaft. A bearing 5 is provided for the shaft 3. The shaft 3 is to be operated by a crank 6 in manually operated starters, but the crank 6 would not be used with electric starters. A bar or plate 7 is provided for mounting the safety devices. This bar or plate may be attached to some stationary part of the vehicle by bolts 8. The safety devices include a ratchet wheel 9 and a clutch 10 integral with the wheel 9, which are loosely mounted on the shaft 3. The wheel and clutch are mounted on the bar 7 by means of a cylindrical boss 11 integral therewith and projecting through the bar 7 and forming a journal to revolve in said bar. A cylindrical boss 12 is formed on the boss 11. A cylindrical keeper 13 is mounted on the boss 12 and attached to the boss 11 by countersunk rivets 14. This arrangement will permit the ratchet wheel 9 and the clutch 10 to revolve freely on the bar 7 as a bearing, but the clutch and ratchet wheel will be held in place by the keeper 13. A bolt or stud 15 is rigidly mounted in the crank shaft 3 to be engaged by the clutch 10 in case of backward turning of the shaft 3. Means are provided for locking the ratchet wheel 9 rigid with bar 7 in case of backward turning of the shaft 3. Dogs 16 and 17 are pivotally mounted on the bar 7 and adapted to engage the ratchet wheel 9 in case of backward turning. When cranking the car, the dogs 16 and 17 will ride over the teeth of the wheel. Means are provided for making the engaging of the dogs with the ratchet wheel 9 positive. Slots 18 are cut in the plate 7 and lugs 19 project through the slots 18 and springs 20 are attached to the bar or plate 7 and bear against the lugs 19. Posts 21 may be inserted in the plate 7 to reinforce the springs 20. Pins 22 are inserted in the lugs 19 to keep the lugs from leaving the plate 7. The slots 18 are wide enough for the swinging of the lugs 19 to permit the necessary movements of the dogs 16 and 17.

In operation, the crank shaft will turn and rotate the clutch 10 and ratchet wheel 9 and the dogs 16 and 17 will ride over the teeth of the ratchet wheel. But, if the shaft 3 turns backward, the dogs will instantly lock the ratchet wheel and clutch against turning. The stud 15 will instantly engage the beveled surface of the clutch and thus effect an axial movement of the shaft sufficient to release the shaft clutch 4 from the clutch 2 so that the shaft 3 will not be driven by the motor.

The invention has been described as applicable to motor vehicles. It is apparent that the devices are applicable to stationary engines or motors for safety in case of "back-firing". Various changes may be made in the construction, arrangement, and proportions of the several parts without departing from my invention.

What I claim, is,—

1. A safety clutch release for motor vehicles in combination with the crank-shaft and motor clutch of a vehicle comprising a bar attached to the vehicle, a ratchet wheel and a release clutch mounted loosely on said shaft and having a cylindrical boss projecting through said bar, a keeper on the opposite side of said bar from said ratchet wheel attached to said boss, spring-controlled dogs mounted on said bar for locking said ratchet wheel rigid with said bar in case of backward turning of the wheel, said release clutch being rigid with said ratchet wheel and having beveled surfaces relatively longer than the beveled surfaces of the motor clutch, and rigid studs projecting from said shaft and adapted to engage the beveled surfaces of said release clutch to move the shaft axially for releasing the motor clutch.

2. A safety clutch release for motor vehicles in combination with the crank-shaft and motor clutch of a vehicle comprising a bar attached stationary to the vehicle frame, a ratchet wheel and a release clutch integral therewith mounted loosely on said shaft, means loosely connecting said ratchet wheel and release clutch to said bar in normal condition, dogs pivotally mounted on said bar locking said ratchet wheel to said bar in case of backward turning of the ratchet wheel, said dogs having lugs projecting through said bar and springs on the opposite side of said bar from the dogs bearing against said lugs, said release clutch having beveled surfaces relatively longer than the beveled surfaces of said motor clutch, and studs rigid with said shaft and adapted to engage the beveled surfaces of said release clutch in case of backward turning of the shaft for releasing the motor clutch.

In testimony whereof, I set my hand, this 7th day of March, 1917.

JAMES T. A. TODD.

Copies of this patent may be obtained for five cents each, by addressing the "Commissioner of Patents, Washington, D. C."